Figure 1:
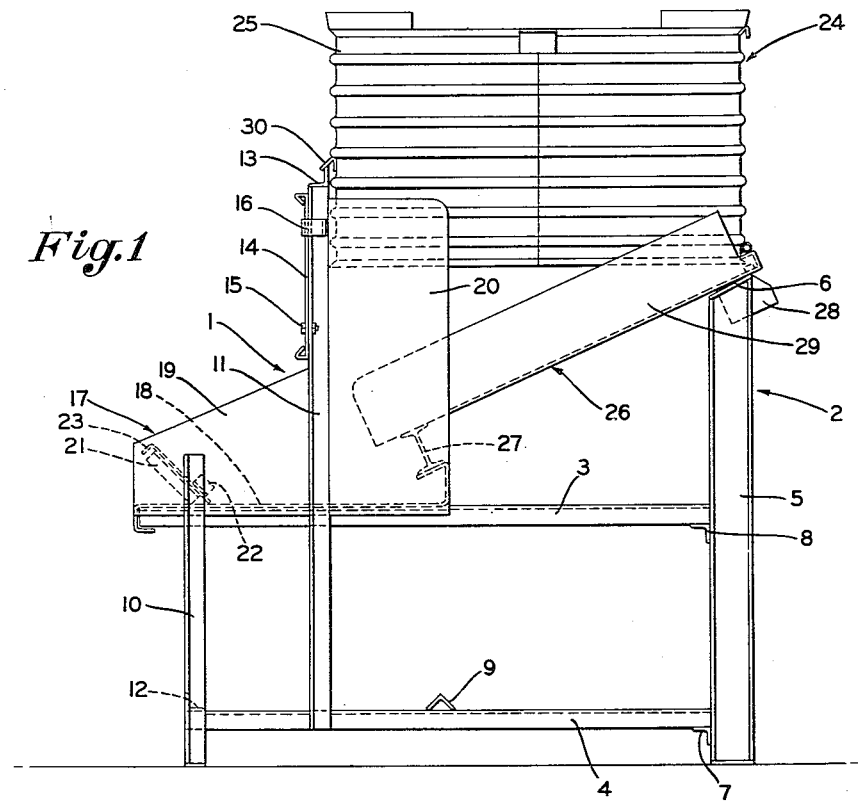

Nov. 27, 1956 — L. W. SHEA ET AL — 2,772,036
MATERIALS HANDLING EQUIPMENT
Filed March 15, 1954 — 2 Sheets-Sheet 1

INVENTORS
Lindsey West Shea and
Joseph C. Streb
BY Frease & Bishop
ATTORNEYS

Nov. 27, 1956   L. W. SHEA ET AL   2,772,036
MATERIALS HANDLING EQUIPMENT

Filed March 15, 1954   2 Sheets-Sheet 2

INVENTORS
Lindsey West Shea
BY Joseph C. Streb
Frease & Bishop
ATTORNEYS

United States Patent Office 2,772,036
Patented Nov. 27, 1956

2,772,036

MATERIALS HANDLING EQUIPMENT

Lindsey West Shea and Joseph C. Streb, Canton, Ohio, assignors to The Union Metal Manufacturing Company, Canton, Ohio, a corporation of Ohio Application March 15, 1954, Serial No. 416,360

5 Claims. (Cl. 222—457)

Our invention relates to materials positioning equipment to position materials at a work station to be readily accessible for further manufacturing operations and more specifically to an improved tray or pan front for such materials positioning equipment.

Some of the prior constructions of materials positioning equipment have consisted of hoppers having a box-like portion which can be filled with work materials with the bottom portion of the box-like portion opening onto a pan or tray. Other types of materials positioning equipment consisted of a positioning stand for use with some form of bottom dump boxes so arranged so that the work material can be dumped from the bottom of the box onto a pan or tray spaced below. The pan or tray portions of both of these types of prior constructions have usually contained solid forwardly sloping walls which retain the work material in the pan or tray so that it may be selectively removed as required.

Such equipment has been satisfactory for use with smaller pieces and parts, but when used for large disks or blanks, or larger parts, many difficulties have arisen. The principal difficulty is that the sloping wall causes the parts or material to pile up a distance from the front of the positioning stand so that it is necessary for the workman to reach back into the stand to obtain such material. With the increased size and weight of the parts the workman must exert additional, unnecessary and depleting energy.

Another difficulty of the prior constructions is that the workman must place his hands and arms within the confines of the stand to obtain the parts. As the front pieces are removed from the pan or tray, the back pieces push forward, and due to their larger size and weight can cause considerable injury to the hands of a worker. Because of the solid sloping front, it is difficult to use tongs to remove the pieces from the pan or tray, since the parts become wedged at the lower part of the pan front.

It is therefore a general object of the present invention to provide a tray or pan front which eliminates the stated difficulties with prior constructions.

It is a further object of the present invention to present a tray front which allows the work to be easily and conveniently removed.

It is still a further object of the present invention to provide a tray front which allows the work held in the positioning stand to flow completely to the front of the tray.

It is an additional object of the present invention to present a tray front which allows the work pieces to be removed without endangering the hands of the workman.

It is still another object of the present invention to present a tray front with which tongs can be conveniently used to remove the work pieces so that it is not necessary for the workman to place his hands and arms within the confines of the positioning stand.

Finally, it is an object of the present invention to present a pan front construction which accomplishes all of the above objects yet is simple in design, economical to manufacture, and durable in use.

These and other objects are accomplished by the parts, constructions, arrangements, combinations and sub-combinations comprising the present invention, the nature of which is set forth in the following general statement, a preferred embodiment of which—illustrative of the best mode in which applicants have contemplated applying the principles—is set forth in the following description and illustrated in the accompanying drawings, and which is particularly and distinctly pointed out and set forth in the appended claims forming a part hereof.

In general terms the improved tray construction constituting the present invention may be stated as including in materials handling work positioning equipment, a tray member having a front portion, a transverse member connected to the tray front portion, and spaced vertical projections mounted on the transverse member; whereby the transverse member and the projections mounted thereon will retain work materials in the tray member until selectively removed by a workman.

More specifically, the improved tray construction constituting the present invention may be stated as including in materials handling work positioning equipment, a tray member having a front portion, a removable transverse member connected to the tray front portion, spaced upwardly extending vertical pins mounted on the transverse member, connecting arms mounted on the transverse member, and engagement means mounted on the connecting arms; whereby the removable transverse member may be selectively mounted at the front portion of the tray member to retain work materials in the tray member until selectively removed by a workman.

Figure 2:
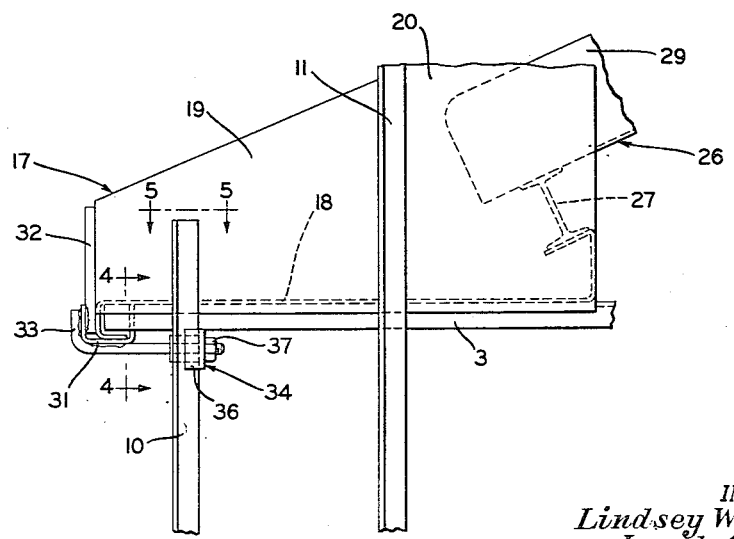
Figure 3:
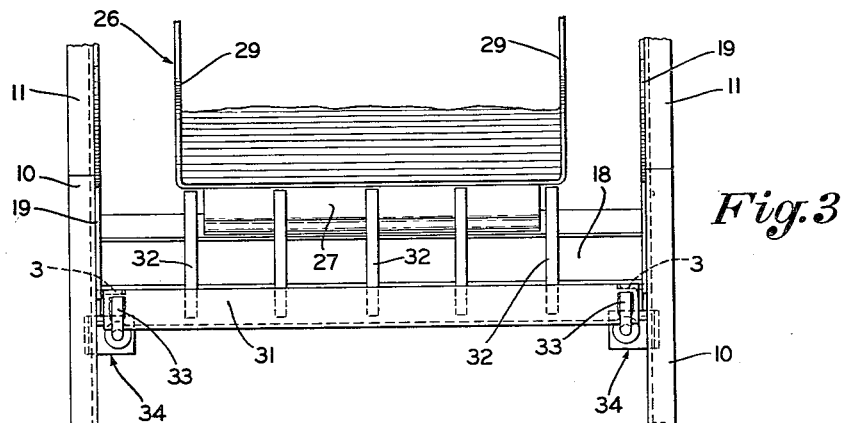
Figure 4:
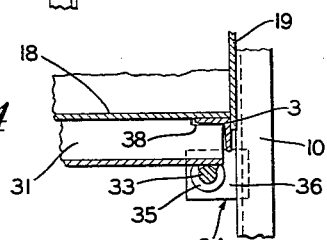
Figure 5:
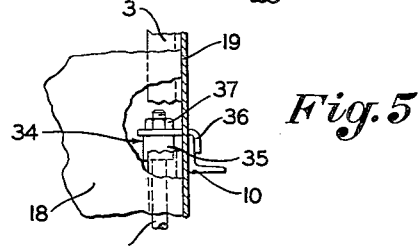
Figure 6:
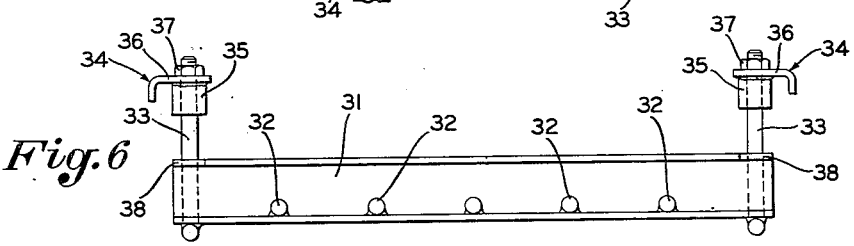
Figure 7:
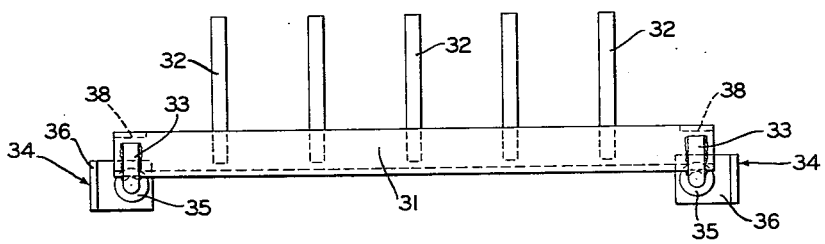
Figure 8:
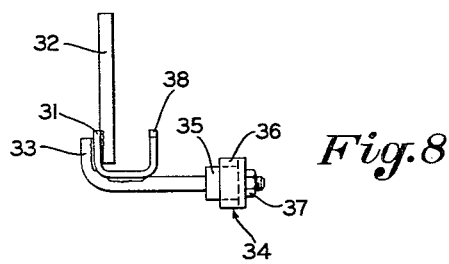

By way of example, an embodiment of the improved pan construction of the present invention is illustrated in the accompanying drawings forming a part hereof, wherein like numerals indicate similar parts throughout the several views, and in which:

Fig. 1 is a side elevation of a materials handling positioning stand and bottom dump work box with the positioning stand having a pan portion with a solid removable front;

Fig. 2, an enlarged fragmentary side view showing the materials handling positioning stand of Fig. 1 with the removable pan front removed and a pin type pan front of the present invention attached in place;

Fig. 3, a front view looking from the left side of Fig. 2;

Fig. 4, an enlarged fragmentary sectional view looking in the direction of arrows 4—4 in Fig. 2;

Fig. 5, an enlarged top fragmentary sectional view looking in the direction of arrows 5—5 in Fig. 2;

Fig. 6, a top elevation of the improved pan front removed from the positioning stand;

Fig. 7, a front elevation of the improved pan front removed from the positioning stand; and Fig. 8, a side elevation of the improved pan front.

The embodiment of our present invention hereinafter described is shown and adapted to be used with a positioning stand and associated tray construction such as shown and described in our copending applications Ser. No. 254,952, now Patent No. 2,690,277, dated Sept. 28, 1954, and Serial No. 344,048. It should be understood, however, that the use of our invention is not restricted to such equipment but can be readily adapted to be used with many other types of positioning stands and hoppers.

The positioning stand and tray construction is shown in Fig. 1 having a bottom dump box positioned thereon. The positioning stand is of a generally three-dimensional structural member design and is preferably of welded construction.

The positioning stand is made up of end frames generally indicated at 1 and 2 connected by two sets of parallel longitudinally extending members 3 and 4. The rear end frame 2 consists of parallel vertical members 5 which are preferably steel I-beams and are cut off at their upper ends at a downward angle over which are welded bearing plates 6 as shown. Vertical members 5 are connected at their lower portions by transverse angle member 7 and at their central portions by transverse angle member 8.

The longitudinally extending angle members 4 are affixed to the top edge of transverse angle member 7 and at their rearmost ends abut the front surfaces of vertical members 5. The longitudinally extending angle members 3 are affixed to the top surface of transverse angle member 8 and likewise abut the front surface of vertical members 5. The longitudinally extending angle members 3 and 4 are connected to the front end frame 1 at their front portions and the longitudinally extending angle members 4 are connected at their central portions by transverse angle member 9.

The front end frame 1 is made up of parallel vertically extending front leg members 10 and parallel vertically extending members 11. Vertical members 10 are connected at their lower portions by transverse angle member 12 and their upper portions connect to longitudinally extending angle members 3. The longitudinally extending angle members 4 are fixed to the lower surface of transverse angle member 12 and the inside surface of vertical angle members 10.

The vertical angle members 11 are affixed at their lowermost ends to the inside surface of longitudinally extending angle members 4 rearwardly disposed from front vertical members 10. The vertical members 11 are also connected to the inside surfaces of longitudinally extending angle members 3 and extend upwardly so that their uppermost ends are above the uppermost ends of rear vertical members 5. Vertical members 11 are connected at their uppermost ends by transverse angle member 13, as shown.

A vertically adjustable gate member 14 abuts the front surfaces of vertical members 11 at their upper portions spaced from their upper ends and is affixed to vertical members 11 by bolts 15 and side clamps 16, as shown.

The tray portion is generally indicated at 17 and consists of a bottom member 18 and side walls 19 and 20. Bottom member 18 is affixed to the top surfaces of longitudinally extending angle members 3 and extends forwardly to the forwardmost ends of longitudinal angle members 3 and then downwardly and inwardly or rearwardly as shown in Figs. 1 and 2, forming a flanged forward edge spaced forwardly from the vertically extending members 10. Bottom member 18 at its rear portion extends vertically upward and then forwardly downward in an angled portion.

The side walls 19 are affixed to the outer side surfaces of longitudinal angle members 3 and extend vertically upward, being affixed to the inner surfaces of vertical members 11. The front and rear edges of side walls 19 are vertical and the top edges are angled upwardly from their front edge to their rear edge, as shown in Figs. 1 and 2, with the front edges thereof being substantially vertically aligned with the forward edge of bottom member 18 and thus spaced forwardly from vertically extending members 10.

The side walls 20 are fixed at their lower ends to the outer side surfaces of longitudinal angle members 3 and at their front edges to vertical angle members 11 extending rearwardly and upwardly as a generally rectangular wall.

Fixed to the inner surfaces of side walls 19 are angle members 21 and 22, arranged so that a removable front member 23 may be selectively positioned therebetween as shown in Fig. 1.

A bottom dump box is generally indicated at 24. It is rectangular in shape consisting of vertical side walls 25 and a bottom wall or platform 26 hingedly connected to one of the side walls 25. Bottom platform 26 has leg members 27 and 28 mounted on its lower surface and also is provided with opposite upwardly extending vertical flanges 29.

The box 24 is adapted to be engaged by the front end frame 1 by an engagement member 30 on the box which engages over transverse angle member 13. The bottom platform 26 of the box rests on the bearing plates 6 on the rear end frame 2, and the front leg 27 rests on the rear portion of the bottom wall 18 of the tray 17 as shown.

The improved tray front of the present invention is shown in Figs. 6, 7 and 8 includes a transverse preferably U-shaped cross-section channel member 31, upstanding pin members 32, connecting arms 33, and hook members 34. Channel member 31 is positioned so that its leg portions extend vertically upward.

Pin members 32 are mounted on the inside surface of the front leg portion of channel member 31 and are parallel to each other and extend vertically upward forming upwardly opening U-shaped recesses between the pin members as shown. Connecting arms 33 are affixed to the ends of channel member 31 and are mounted on the front surfaces of the front leg portion and extend downwardly and then horizontally rearwardly, as shown.

Hook members 34 include a cylindrical portion 35 and a hook portion 36. The cylindrical portions 35 are selectively received over the rear portions of connecting arms 33. The hook portions 36 are affixed to the rear surfaces of cylindrical portions 35 and extend outwardly and then forwardly. The rearmost ends of connecting arms 33 are threaded to receive nuts 37 which selectively abut the rear surfaces of hook portions 36. Notched cut outs 38 are formed in the back leg portion of channel member 31 and extend inwardly from the ends of channel members 31.

When it is desired to use the improved pin tray front on the positioning stand shown in Fig. 1, the removable front member 23 is removed, and the improved pin tray front is positioned on the stand, as shown in Figs. 2, 3, 4 and 5, so that the front portion of the bottom wall 18 of the tray member 17 is received between the spaced upstanding leg portions of the channel member 31, and so that the pin members 32 extend vertically upward at the front end of the tray member 17. The top edge of the rear leg portion of the channel member 31 abuts the under side of the bottom wall 18, and the notched cut outs 38 are received over the longitudinally extending angle members 3, as shown in Fig. 4.

As shown in Figs. 2 and 5, the hook portions 36 of the hook members 34 are engaged around the rear edges of vertical angle members 10, and nuts 37 are then tightened so that the hook members 34 are clamped against the vertical angle members 10, and the pin members 32 are locked against the front edge of the bottom wall 18 of the tray member 17. Thus the improved pin tray front is held solidly in place.

When the improved pin tray front is assembled to the stand, in the manner described, parts such as disk blanks dumped from the bottom dump box 24 onto the tray member 17, will flow forwardly until they are stopped by pin members 32. The workman may then remove such parts over the tops of the pin members 32; and if any parts become wedged, they are accessible between the pin members 32 to relieve the wedging and for lifting over the top ends of pin members 32. If the size of the parts warrants the use of tongs, such tongs may be conveniently used by inserting the same between the pin members 32 to grasp a part and lift it over the pin members 32.

Thus an improved tray front construction is provided which allows work pieces to flow or move to the front of the tray and thereafter be selectively removed without endangering the hands or arms of the operator. The improved pin tray front construction also allows the use of tongs if it is so desired and yet is simple and economical to manufacture and will withstand long and continued use.

In the foregoing description, certain terms have been used for brevity, clearness and understanding, but no unnecessary limitations are to be implied therefrom, because such words are used for descriptive purposes herein, and are intended to be broadly construed.

Moreover, the embodiment of the improved construction illustrated and described herein is by way of example, and the scope of the present invention is not limited to the exact details of the construction shown.

Having now described the invention, the construction, operation and use of a preferred embodiment thereof, and the advantageous, new and useful results obtained thereby, the new and useful construction and reasonable mechanical equivalents thereof obvious to those skilled in the art is set forth in the appended claims.

We claim:

1. In materials handling work positioning equipment, tray bottom and side walls forming an upwardly forwardly opening tray member having a front end, barrier means for the front end of the tray member, the barrier means including a transverse member extending between the tray side walls and below the tray bottom wall, spaced pins mounted on the transverse member projecting vertically upward thereof at the front end of the tray member, said pins providing upwardly opening recesses therebetween, and means removably mounting said barrier means on the tray member; whereby the barrier means retains workpieces on the tray member, and whereby such retained workpieces may be grasped through said recesses and lifted upwardly of the tray member for removal.

2. The construction defined in claim 1 in which the tray member is supported on front leg members spaced rearwardly of the front end of the tray member, and in which the means removably mounting the barrier means on the tray member are connected with said leg members below the tray bottom wall.

3. In materials handling work positioning equipment, tray bottom and side walls forming a forwardly opening tray member having a front end, barrier means for the front end of the tray member, the barrier means including a transverse member extending between the tray side walls and below the bottom wall, spaced pins mounted on the transverse member projecting vertically upward thereof at the front end of the tray member, said pins providing U-shaped upwardly opening recesses between the tray side walls, and means connected to the transverse member and tray member below the tray bottom wall releasably mounting the barrier means on said tray member; whereby the barrier means may be selectively positioned on the tray member to retain work material in the tray member.

4. In materials handling work positioning equipment, tray bottom and side walls forming a forwardly opening tray member having a front end, the front end of the bottom wall terminating in a downwardly flanged edge, barrier means for the front end of the tray member, the barrier means including a transverse member positioned at the front end of the tray and engaged with the bottom wall flanged edge, spaced pins mounted on the transverse member projecting vertically upward thereof at the front end of the tray member, said pins providing U-shaped upwardly opening recesses between the tray side walls, and means releasably mounting said transverse member on said tray member; whereby the barrier means may be selectively positioned on the tray member to retain work material in the tray member.

5. In materials handling work positioning equipment, tray bottom and side walls forming a forwardly opening tray member having a front end, the front end of the bottom wall terminating in a downwardly rearwardly flanged edge, barrier means for the front end of the tray member, the barrier means including a generally U-shaped cross-section transverse member having spaced upstanding leg portions formed by said U-shape, said transverse member being positioned with the tray bottom wall flanged edge received between said upstanding leg portions, spaced pins mounted on said transverse member projecting vertically upward thereof at the front end of the tray member, said pins providing U-shaped upwardly opening recesses between the tray side walls, and the rearwardly extending hook means releasably connected between the transverse member and tray member mounting the barrier means on the tray member; whereby the barrier means may be selectively positioned on the tray member to retain work material in the tray member.

References Cited in the file of this patent

UNITED STATES PATENTS

| | | |
|---|---|---|
| 286,647 | Smith | Oct. 16, 1883 |
| 1,716,343 | Langren | June 4, 1929 |
| 2,506,849 | Winterton | May 9, 1950 |
| 2,662,671 | Almas | Dec. 15, 1953 |

FOREIGN PATENTS

| | | |
|---|---|---|
| 654,521 | France | Nov. 29, 1928 |